(12) United States Patent
Hausmann

(10) Patent No.: US 7,670,463 B2
(45) Date of Patent: Mar. 2, 2010

(54) METHOD AND DEVICE FOR PRODUCING A PURE LIQUID FROM A CRUDE LIQUID

(76) Inventor: Kurt Hausmann, Messerschmittring 17, Konigsbrunn (DE) 863443

(*) Notice: Subject to any disclaimer, the term of this patent is extended or adjusted under 35 U.S.C. 154(b) by 1290 days.

(21) Appl. No.: 10/539,800

(22) PCT Filed: Dec. 6, 2003

(86) PCT No.: PCT/EP03/13824

§ 371 (c)(1),
(2), (4) Date: Jun. 20, 2005

(87) PCT Pub. No.: WO2004/056442

PCT Pub. Date: Jul. 8, 2004

(65) Prior Publication Data

US 2006/0113179 A1    Jun. 1, 2006

(30) Foreign Application Priority Data

Dec. 21, 2002    (DE) ................................ 102 60 494

(51) Int. Cl.
*B01D 3/10* (2006.01)
*C02F 1/04* (2006.01)
(52) U.S. Cl. .................... 203/11; 202/205; 203/91; 203/100; 203/DIG. 17
(58) Field of Classification Search ............... 159/47.1, 159/DIG. 16; 202/185.1, 201, 203, 205; 203/10, 11, 91, 100, DIG. 17
See application file for complete search history.

(56) References Cited

U.S. PATENT DOCUMENTS

| 1,594,296 | A | * | 7/1926 | Lee | .......................... 196/128 |
| 2,682,499 | A | * | 6/1954 | Thurman | .................... 202/183 |
| 4,440,601 | A | * | 4/1984 | Katz et al. | .................... 203/24 |
| 4,613,412 | A | * | 9/1986 | MacDermid | ................. 203/91 |
| 5,242,548 | A |   | 9/1993 | Youngner | |
| 5,248,394 | A |   | 9/1993 | Roveti | |
| 5,374,751 | A | * | 12/1994 | Cheng et al. | ................ 554/205 |
| 5,980,695 | A | * | 11/1999 | Cox et al. | ................... 202/166 |
| 6,063,242 | A | * | 5/2000 | Hauser | ....................... 202/205 |

FOREIGN PATENT DOCUMENTS

| DE | 33 45 937 A1 | 12/1983 |
| DE | 38 30 647 A1 | 9/1988 |
| DE | 102 60 494 B3 | 2/2004 |
| FR | D.19.740 | 4/1964 |
| FR | N 2 493 171 | 11/1980 |

* cited by examiner

*Primary Examiner*—Virginia Manoharan
(74) *Attorney, Agent, or Firm*—Bacon & Thomas, PLLC

(57) ABSTRACT

When fresh water is produced from salt water or similar by evaporation of untreated or crude liquid in an evaporation device under partial vacuum and by vapor condensation in a condensation device connected with the vapor outlet of the evaporation device a high degree of evaporation and cost effectiveness can be obtained in that the evaporation device and the condensation device in a disconnected condition, are filled with crude or clean liquid, respectively, and are subsequently exposed to a partial vacuum created by volume enlargement under hermetically sealed conditions and that the evaporation device and the condensation device are not flow-connected with each other until they are under partial vacuum.

8 Claims, 3 Drawing Sheets

METHOD AND DEVICE FOR PRODUCING A PURE LIQUID FROM A CRUDE LIQUID

FIELD OF THE INVENTION

This invention relates to a process for producing clean liquid from untreated liquid, in particular for producing fresh water from salt water, by means of evaporation of the untreated liquid under partial vacuum in an evaporation device and condensation of the vapour in a condensation device connected with the vapour output of the evaporation device.

The invention further relates to a device suitable for carrying out the process, having at least one evaporation device which can be supplied with untreated liquid and in which a partial vacuum can be produced, and further having at least one condensation device which can via a connecting line be supplied with vapour from at least one upstream evaporation device.

BACKGROUND OF THE INVENTION

Such a process and device is known from DE 33 45 937 A1 where the connecting line between an evaporation device and a condensation device cannot be shut off. To produce the desirable partial vacuum, the evaporation device is connected with at least one tank which is filled with untreated liquid, and provided at a height that is at least by the water column producible by the ambient air pressure above a water level, which tank is provided with a downpipe that is immersed in the water level and can be shut off. By opening the downpipe, liquid flows off causing a partial vacuum in the evaporation device if venting thereof is prevented, which partial vacuum is in this case passed on to the condensation device via the open connecting line. The required location of the tank at a high level and the immersing of the bottom end of the downpipe in an existing water level result in a relatively large overall height of the device and high constructional expenditure. Nevertheless, due to the existing connection between the evaporation device and the condensation device, the obtainable partial vacuum is relatively small. In addition, the liquid in which the downpipe is immersed may contain gas bubbles produced by gas emission etc., which may accumulate at the bottom end of the downpipe and then rise in it, which may result in a further deterioration of the obtainable partial vacuum.

SUMMARY OF THE INVENTION

It is an object of the present invention to provide a process and a device as described initially above which ensure high evaporation output at a low boiling point and thus a high degree of cost effectiveness.

According to the invention, this object is achieved, in conjunction with a process whereby an evaporating device and a condenser device have crude or clean liquid therein exposed to a partial vacuum created by volume enlargement under hermetically sealed conditions and further, in conjunction with the device whereby each evaporating device forms a vessel system comprising a pump unit connected with the bottom area of the evaporator device and having an operating chamber of variable size which vessel system can be filled with crude liquid when the operating chamber is reduced in size and is exposed to a partial vacuum in hermetically closed condition by enlarging the operating chamber, whereby the side of the condensation device forms a vessel system comprising a pump unit connected with the bottom area of the evaporation device and having an operating chamber of variable size, which vessel system can be filled with a clean liquid when the operating chamber of the condensation device vessel system is reduced in size and is exposed to a partial vacuum in hermetically closed condition by enlarging the operating chamber of the condensation device vessel system, and whereby a shut-off device is provided in the connecting line for releasing the connecting line only when the operating chambers are enlarged to maximum size.

The measures according to the present invention advantageously result in a high degree of evacuation and thus in a high evaporation output at relatively low temperatures as can advantageously be obtained using simple solar collectors or the like. The measures according to the invention may further also be realised in an advantageous manner by a highly compact and correspondingly easy-maintenance arrangement. Thus, the measures according to the invention serve to achieve the above-mentioned object of the invention in a most simple and low cost manner.

The evaporation device may advantageously comprise a heater and a separator provided downstream thereof. Such an arrangement permits the direct or indirect heating of the raw water to be vaporised outside the separator, thus allowing a high degree of freedom of design.

A further advantageous measure to improve the output may consist in cooling the condensation device during the condensation process. The heat thus generated may advantageously be used for preheating the raw water to be vaporised.

A further, particularly preferential measure may consist in that the condensation device is stimulated to perform vibrating movements during the condensation process. Thus, the formation of water droplets on the condensate side of the condensation device is prevented, which may affect the thermal transfer and thus condensation. Instead, the vibrating movement ensures that the droplets run off rapidly leaving only a very thin water layer on the condensate side.

A further advantageous measure may consist in that the vapour coming from the evaporation device is pumped into the condensation device by means of an injection device. This advantageously permits an increase in pressure within the condensation device, having a positive effect on the acceleration of the condensation process.

BRIEF DESCRIPTION OF THE DRAWINGS

Further advantageous embodiments and expedient developments of the main-claim measures are evident from the remaining sub-claims and can be derived from the description of an example given below in conjunction with the accompanying drawings wherein:

DESCRIPTION OF THE PREFERRED EMBODIMENT

The present invention is mainly used for seawater desalination, that is to say for producing fresh water from salt water. The plant according to the invention is thus advantageously installed at the sea shore so that practically unlimited amounts of the required salt water can be taken from the sea.

Figure 1:
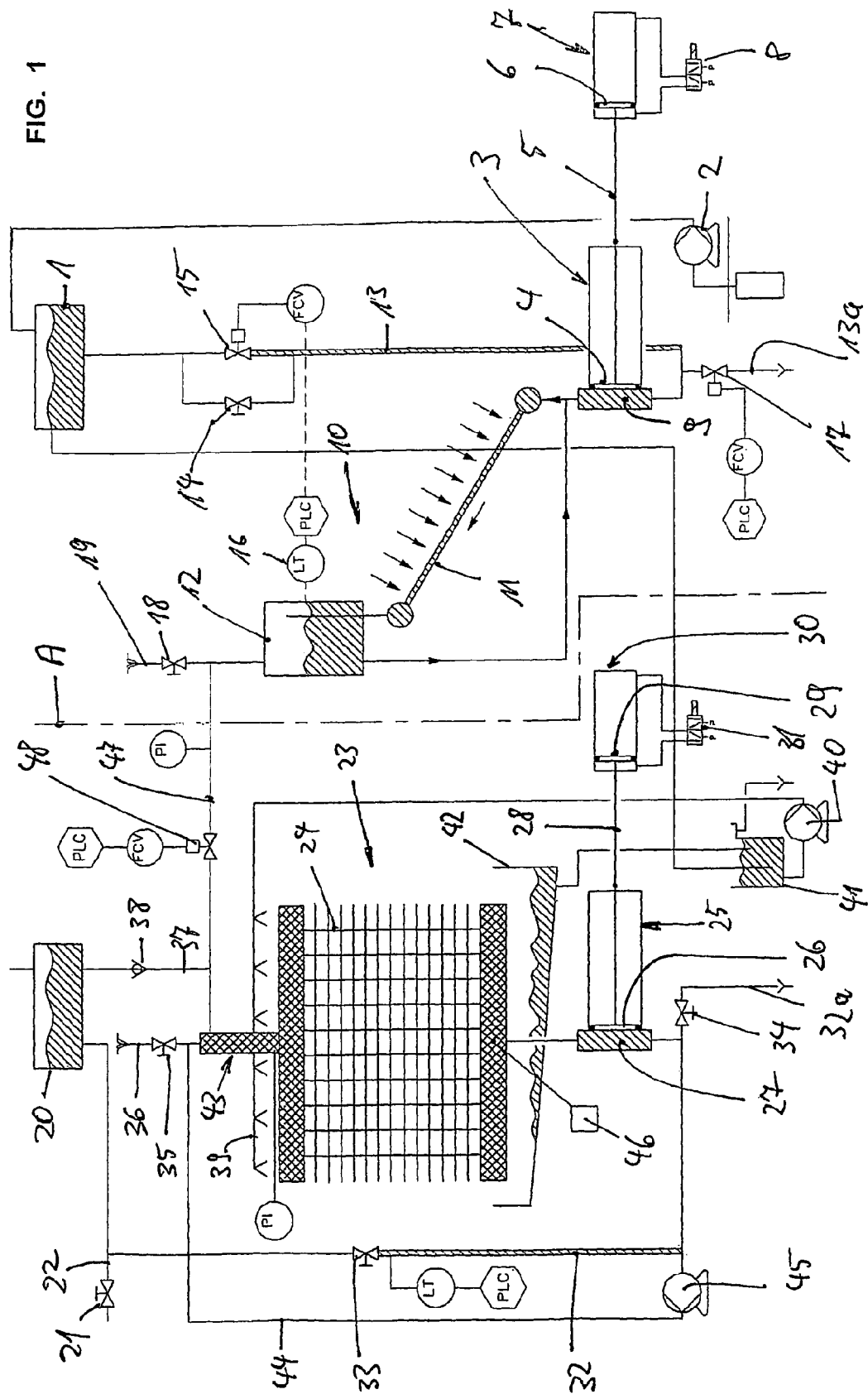
FIG. 1 shows a functional diagram of a seawater desalination plant having an evaporation and a condensation device.

Plants as described in the present invention comprise an evaporator and a condenser side each. FIG. 1 contains a dot-dash separation line A, with the evaporator side on the right-hand side of such line, and the condenser line on the left-hand side thereof. The evaporator side comprises a raw water tank 1, designed as a trough which is open towards the top, which is suppliable with seawater via a pump 2. Below the raw water tank 1 provision is made for a lower-level cylinder-piston unit 3 comprising a piston 4 provided in a cylinder, which piston is connected via a piston rod 5 with a piston 6 of an equal-stroke cylinder-piston unit 7, which is actuatable by hydraulic or preferably pneumatic force, which unit is connected with a suitable energy source not shown in detail here, but shown in the present example in the form of a pressurized oil source and controllable by a control valve 8. The cylinder-piston unit 3 comprises an operating chamber 9, limited by the piston 4, which can be reduced or increased in size within the associated cylinder by a movement of the piston 4.

Above the level of the cylinder-piston unit 3 provision is made for an evaporation device 10 comprising a heater 11 and a downstream separator 12. In the example illustrated, the heater 11 is designed as a solar collector ensuring practically direct heating by solar energy. It would of course be also conceivable to integrate the heater into a heat exchanger and to supply the heat via a secondary heating circuit, as is indicated for example on the right-hand side of FIG. 2. The separator 12, where water is separated from vapour, is provided above the level of the heater 11 but still below the raw water tank 1. The evaporation unit 10 comprising the heater 11 and the separator 12 together with the operating chamber 9 constitute an inter-connected vessel system which can be shut off towards the outside. For this purpose, connecting lines exist between the operating chamber 9 and the bottom side of the heater 11, between the top side of the heater 11 and the separator 12 and between the separator and the operating chamber 9. The line leading from the separator 12 to the operating chamber 9 extends from the bottom of the separator 12. The line from the heater 11 to the separator 12 exits into the top area of the separator 12.

A supply line 13 which can be shut off by a valve arrangement is provided from the raw water tank 1 to the bottom side of the operating chamber 9. In the example illustrated, the valve arrangement associated with the supply line 13 comprises two parallel branches provided with a valve 14 and a valve 15, respectively, one of which, in this example valve 15, being controllable by a level controller 16 associated with the separator 12. An outlet nozzle 13a, which can be shut off by a valve 17, extends from the bottom area of the supply line 13. A venting line 19 which can be shut off by a valve 18 extends from the top area of the separator 12.

The condenser side comprises a clean water tank 20 provided at the same level as the raw water tank 1, which clean water tank can be supplied with clean water via an inlet 22 which is connected with a clean water source and can be shut off by a valve 21. Below the level of the clean water tank 20 provision is made for a condensation device 23 which in this example comprises a multitubular condenser 24. Below the condenser 24 provision is made for a cylinder-piston unit 25 whose piston 26 limits an operating chamber 27 and is connected via a piston rod 28 with the piston 29 of an equal-stroke cylinder-piston unit 30 which is preferably actuatable in the same manner as the cylinder-piston unit 7, which cylinder-piston unit 30 can be connected with the same hydraulic pressure medium source as the cylinder-piston unit 7 and is controllable by a control valve 31.

A supply line 32 is provided from the clean water tank 20 to the bottom area of the operating chamber 27. The supply line 32 can be shut off by a valve 33. An outlet line 32a which can be shut off by a valve 34 extends from the supply line 32. A venting line 36 which can be shut off by a valve 35 extends from the inlet of the condenser 24. In addition, the inlet of the condenser 24 is connected with the clean water tank 20 via an outlet line 37 comprising a check valve 38. The check valve 38 is designed in such a manner that it opens in the direction of the clean water tank 20.

The condenser 24 and the operating chamber 27 of the cylinder-piston unit 25 constitute a connected vessel system which can be shut off towards the outside. For this purpose, the operating chamber 27 is connected with the bottom area of the condenser 24. The maximum volume enlargement of the operating chamber 27 obtainable by a movement of the piston 26, which in this example is performed to the right-hand side, is expediently larger than the capacity of the condenser 24 on the condensate side.

In the embodiment shown, this cooling device contains a sprayer device 39 which can be fed with cooling water, preferably raw water, supplied by an associated cooling water pump 40. The jet of the sprayer device impinges on the outside of the condenser 24 whose inside is exposed to vapour. A cooling water tank 41 is therefore associated with the cooling water pump 40 and can be supplied with raw water via a supply line extending from the raw water tank 1. The cooling water flowing off from the condenser 24 is collected in a collecting trough 42 arranged underneath the condenser 24, with a return line leading back to the cooling water tank 41.

Figure 3:
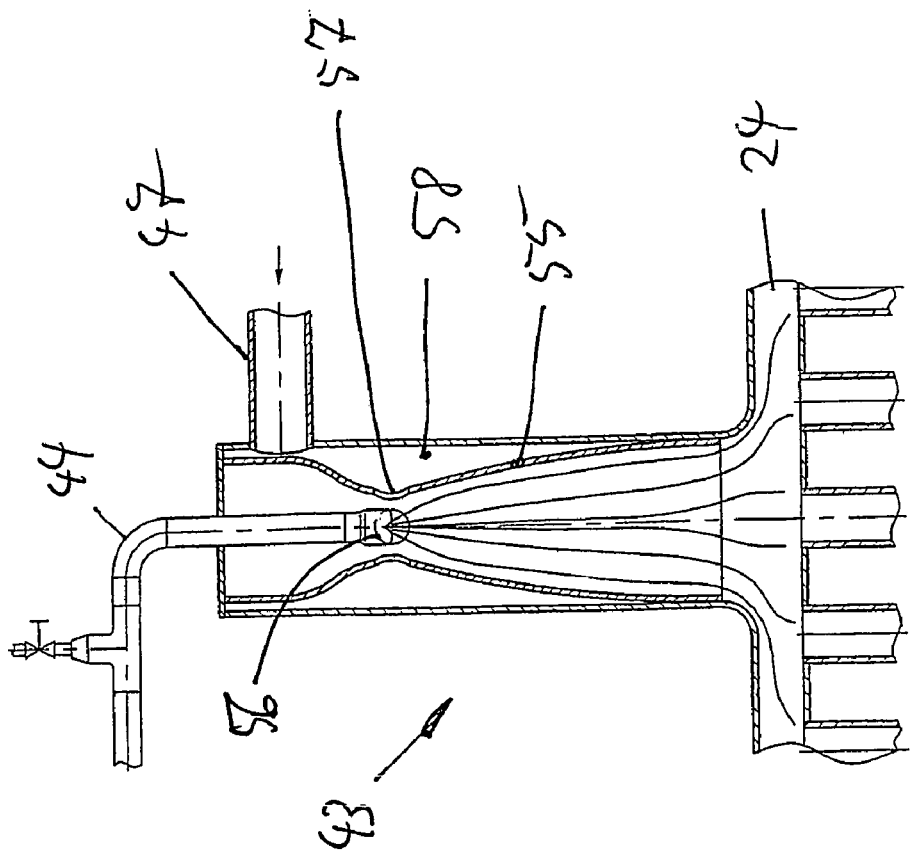
FIG. 3 shows a section of an injection device associated with a condensation device.

Associated with the vapour inlet of the condenser 24 is an injection device 43 which will be described in further detail below in conjunction with by means of FIG. 3. This injection device comprises a venturi tube supplied with clean water. For this reason, a supply line 44 is associated with the injection device 43, which supply line is provided with a pump 45 whose suction side is arranged adjacent to the operating chamber 27. The injection device 43 brings about a pressure increase within the condenser 24, thus resulting in an improved condensation effect.

To further improve the condensation effect, the condenser 24 may be designed as a vibrating condenser which during the condensation process is stimulated by a vibration generator 46 to perform vibrating movements which will be described in further detail in connection with FIG. 4.

The evaporator side is connected with the condenser side by a connecting line 47 leading from the exit of the separator 12 to the inlet of the condenser 24. The connecting line 47 can be shut off by a valve 48 which is expediently controllable by a controll unit preferably in the form of a PLC. This also applies accordingly to the valves 15, 17 and 33. The other valves may expediently be designed as manually controlled valves.

To start the plant, the raw water tank 1 is first filled with seawater by means of the associated pump 2. The cooling water tank 41 is connected with the overflow of the raw water tank 1. All valves are closed while the manual venting valve 17 is opened. The piston 4 of the cylinder-piston unit 3 is in its end position, here on the left-hand side, which corresponds to the smallest volume of the operating chamber 9, as indicated in FIG. 1. Upon opening the manual valve 14, the condenser side is flooded until the raw water flows off at the venting line 19. As soon as this is the case, the valves 18 and 14 will be closed.

On the condenser side, all automatic and manual valves are initially closed. First of all, by opening the valve 21, about one third of the clean water tank 20 is filled with clean water from the outside. Afterwards, the valve 21 is closed again and the venting valve 35 opened. The piston 26 of the cylinder-piston unit 25 is in its end position, here on the left-hand side, which corresponds to the smallest volume of the operating chamber 27. Upon opening the valve 33 provided in the supply line 32, the entire condenser system is flooded until raw water flows off at the venting line 36. As soon as this is the case, the valves 35 and 33 are closed.

Due to the activation of the cylinder-piston units 7 and 30 by activating or actuating the associated control valves 8 and 31, respectively, the pistons 4 and 26 of the cylinder-piston units 3 and 25 are moved into their respective end positions opposite the end position shown in FIG. 1, whereby the operating chambers 9 and 27 limited by the pistons 4 and 26, respectively, are enlarged to their maximum volume. On the evaporator side the liquid level in the separator 12 drops to the operating position as illustrated. The volume enlargement obtainable by the movement of the piston 4 is accordingly smaller than the entire capacity of the separator 12. On the condenser side the liquid level sinks below the middle of the associated cylinder-piston unit 25. Accordingly, the volume enlargement obtainable by the movement of the piston 26 of the cylinder-piston unit 25 is greater than the internal capacity, that is to say, the condensate-side capacity, of the condenser 24. In this case the volume enlargement described above corresponds to more than twice the capacity of the condenser 24.

The vessel systems comprising the operating chamber 9 and the evaporation device 10, and the operating chamber 27 and the condenser 24, respectively, are hermetically sealed towards the outside. The volume enlargement of the operating chambers 9 and 27 result in a nearly complete vacuum, or in any case in a very high partial vacuum, in these hermetically sealed-off vessel systems, whereby the water in the entire system will boil at already relatively low temperatures.

The heating energy supplied to the evaporator 11, in this example the directly supplied solar energy, maintains this boiling process. On the condenser side, the cooling device is started by switching on the pump 40, while simultaneously, by switching on the pump 45, the injection device 43 is put in operation. By opening the valve 48 provided in the connecting line 47, vapour pours from the separator 12 into the condenser 24. The injection device 43 causes a pressure increase which permits condensation at higher temperatures and thus increases the temperature difference between the condensation temperature and the temperature outside of the condenser. The cooling device in the embodiment illustrated, which is designed as a spraying device 39 fed with raw water, reaches a high degree of efficiency, thus improving the condensation output even further.

The water evaporating on the outside of the condenser 24 is continually replenished by water flowing from the overflow of the raw water tank 1 to the cooling water tank 41. To further increase the output, a fan or blower might be associated with the condenser 24 whereby a cooling tower effect could be achieved.

To avoid excessive salt concentration in the cooling water tank 41, the overflow coming from the raw water tank 1 is led directly into the suction-side range of the pump 40. Thus, the same amount of slightly concentrated salt water in the return line of the cooling circuit will flow into the overflow extending from the cooling water tank 41 as water flows in from the raw water tank 1.

To further increase the output of the condenser 24, the oscillation generator may be put in operation, which is designed in such a manner that it can stimulate the associated condenser 24 to perform vibrations in a frequency range of 5 to 20,000 Hz, thus considerably increasing the effectiveness of the condenser 24.

The boiling water in the separator 12 is maintained at a constant level by automatically supplying water from the raw water tank 1. This is achieved by a level controller 16 associated with the separator 12, which acts to control the valve 15 provided in the supply line 13.

Due to the constant condensation in the condenser 24, the liquid level on the condenser side is permanently rising. When this level has reached the bottom side of the condenser 24, a signal emitted by a suitable level alert causes the valve 48 provided in the connecting line 47 to be closed and the control valve 31 to be reversed, whereby the piston 26 of the cylinder-piston unit 25 is moved in the direction reducing the volume of the operating chamber 27. Thus, the collected, condensed, and therefore desalted water is pressed into the clean water tank 20 via the discharge line 37 which is provided with the check valve 38. When the smallest volume of the operating chamber 27 is obtained, the control valve 31 is automatically reversed, thus urging the piston 26 into the opposite direction where it produces a high vacuum again. Then the valve 48 provided in the connecting line 47 can be opened again, so that a new cycle can start. On the evaporator side, the vacuum can likewise be augmented in the above-described manner by activating the cylinder-piston unit 3 while the associated vessel system is hermetically sealed.

Figure 2:
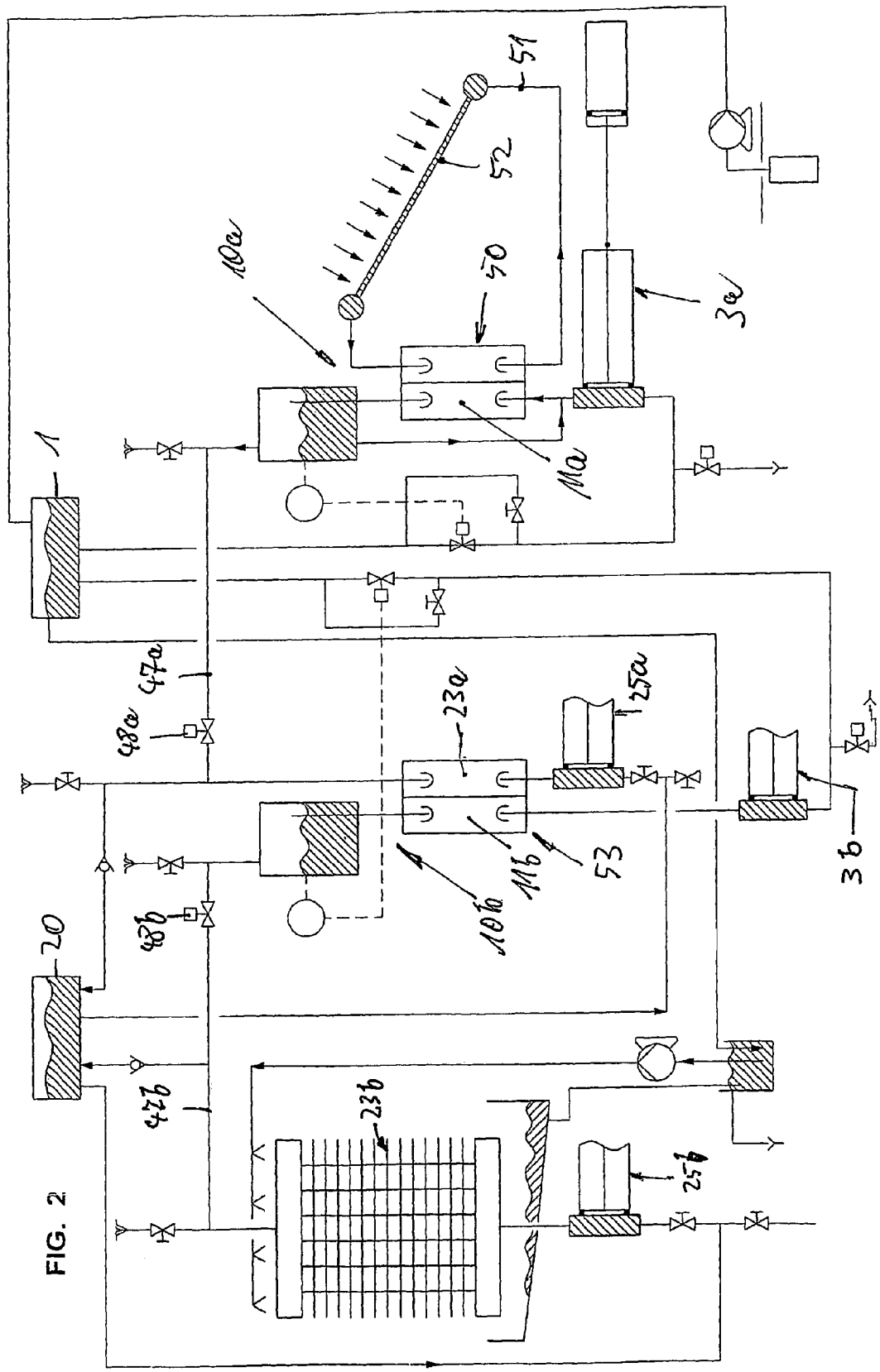
FIG. 2 shows a functional diagram of a seawater desalination plant having several evaporation and condensation devices.

The arrangement according to FIG. 2 differs from that in FIG. 1 merely in that provision is made for two evaporation devices 10a, 10b and two condenser devices 23a, 23b. The evaporation device 10a is connected with the condensation device 23a via a connecting line 47a having a valve 48a. The evaporation device 10b is connected with the condensation device 23b via a connecting line 47b having a valve 48b. A cylinder-piston unit 3a, 3b and 25a, 25b, is associated with each evaporation device and condensation device, respectively. A particularity in comparison with FIG. 1 consists here in that the heater 11a of the evaporation device 10a in this example is not heated directly but, as mentioned above, indirectly. For this purpose, provision is made for a heat exchanger, one side of which forms the heater 11a of the evaporation device 10a and the other side of which is located in a secondary heating circuit 51 extending via a solar collector 52. The heater 11b of the evaporation device 10b and the condenser of the condensation device 23a also form a heat exchanger 53 which has the effect that the condensation heat of the condensation device 23 is simultaneously used for heating the raw water flowing through the heater 11b. It may be expedient to design the heat exchangers 50 and 53 as plate heat exchangers.

An injection device 43 may be associated with the vapour inlet of each of the condensation devices, as mentioned above. An example hereof is illustrated in FIG. 3. The injection device 43 shown here comprises a venturi tube 55 having a constriction and whose interior is exposed to a clean water jet. For this purpose, the supply line 44 associated with the injection device 43 is provided with a spray nozzle 56 within the area of the above-mentioned constriction. The venturi tube 55, in the area of the constriction, is provided with radial inlets 57 which constitute a connection with a surrounding annular space 58 communicating with the connecting line 47. The clear water jet generated by the spray nozzle 56 produces a partial vacuum which sucks the vapour from the annular space 58 into the inside via the radial inlets 57 and presses it into the associated condenser 24 which in the example shown is a multitubular condenser, whose interior is supplied with vapour and whose outside can be cooled by air or an additional coolant.

A particularly high condenser output can be achieved, as mentioned above, by using the vibration generator 46 for stimulating the condenser to perform vibrating movements during condensation. This will prevent the formation of water droplets on the inside of the condenser tubes which would affect the condensation process.

Figure 4:
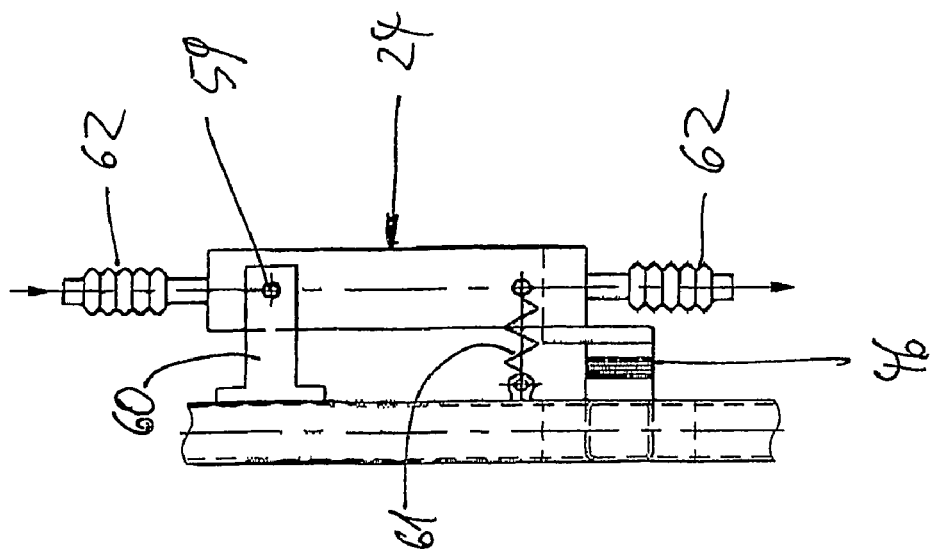
FIG. 4 shows a side view of a vibratable condenser.

FIG. 4 shows a condenser 24 which can be stimulated to perform vibrating movements. For this purpose, the condenser is on one side held in an oscillating bearing, and on the other side connected with the vibration generator 46. In the example illustrated, the condenser 24 is within the area of its upper end suspended in an oscillating manner around a horizontal axis 59 on a fixed bearing bracket 60 while being connected at its bottom end with the vibration generator 46 which is likewise fixed to a bracket and provided with a recuperating spring. The inlet and outlet lines of the condenser 24 are provided with flexible fittings 62 and via those are connectable with firmly installed lines.

The frequency of the vibrations generated by the vibration generator 46 may be in the range of 5 to 20.000 Hz. The optimal frequency has to be established in each individual case by experimentation. The effectiveness of the condenser can thus be increased by up to 60%, if an appropriate frequency is selected. The reason for such improvement lies in the fact that, due to the vibrating movements, the water condensing on the inside of the condenser tubes flows off before an excessive formation of droplets, thus preventing a water-caused insulation and improving the heat passage through the condenser tubes.

The invention claimed is:

1. A process for producing a clean liquid from a crude liquid by means of an evaporation device and a condensation device connectable with the vapor outlet of the evaporation device, comprising the steps of:

filling the evaporation device with crude liquid and the condensation device with a clean liquid, when they are disconnected;

exposing the crude liquid and the clean liquid in each device to a partial vacuum created by volume enlargement under hermetically sealed conditions; and subsequently flow connecting the evaporation device and the condensation device.

2. The process according to claim 1, further comprising the step of:

heating the crude liquid in a heater; and separating the vapor in a separator associated with the heater.

3. The process according to claim 1, further comprising the step of:

cooling the condensation device during condensation.

4. The process according to claim 1, further comprising the step of:

injecting a vapor into the condensation device using clean liquid from the condensation device.

5. The process according to claim 1, further comprising the step of:

stimulating the condensation device to perform vibrating movements.

6. The process according to claim 1, further comprising the step of:

filling the evaporation device from a raw water tank located at a higher level and refilled as and when required.

7. The process according to claim 1, further comprising the step of:

filling the condensation device from a higher-level clean water tank into which the condensed water is urged due to volume reduction.

8. The process according to claim 1, wherein: the crude liquid is salt water and the clean liquid is fresh water.

* * * * *